3,386,841
PROCESS FOR THE MANUFACTURE OF PLASTIC ARTICLES DYED IN THE MASS
Oskar Braun and Richard Gross, Frankfurt am Main, Heinz Müller, Burgkirchen, Upper Bavaria, Herbert Nakaten, Bad Soden, Taunus, and Josef Weissert, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 8, 1964, Ser. No. 366,182
Claims priority, application Germany, May 11, 1963, F 39,723
5 Claims. (Cl. 106—165)

It is already known to produce spin-dyed structures, for instance, fibers, foils or other shaped structures of semi-synthetic or fully synthetic plastics formed from aqueous solutions by adding to the spinning mass, prior to the final shaping, an aqueous dispersion of an appropriate, finely dispersed pigment, for instance, an azo-pigment or a phthalocyanine-pigment and then shaping the mass in the usual manner. The pigment particles, however, badly affect the spinning properties of the mass; moreover no transparently dyed structures can be prepared.

Now we have found that it is possible to prepare structures dyed in the mass, such as fibers, foils or other shaped articles of semi-synthetic or fully synthetic plastics, formed from aqueous solutions or pastes by adding to the plastic masses prior to their final shaping, an aqueous solution of an azo-pigment containing at least a weakly acid group or a group convertible thereto by adding strong bases, or of a phthalocyanine pigment containing a plurality of sulfonic acid arylamide groups or sulfonic acid alkylamide groups in the molecule. This solution is obtained by dissolving the pigments with the aid of a quaternary, surface-active compound or of an aqueous solution of said quaternary compound. If desired, a strongly basic agent as well as an organic solvent can also be used.

For realizing the process according to the invention it is advisable to prepare at first a concentrated aqueous or water-containing solution of the pigment by dissolving the pigment in a quaternary surface-active compound or its aqueous solution, if desired with the simultaneous use of an agent having a strongly basic action and, if desired, an organic solvent. When operating in this way, the pigment is dissolved, if possible, at room temperature, sometimes likewise at an elevated temperature up to about 100° C., in most cases up to about 80° C., in the cationic auxiliary agent or preferably in a concentrated aqueous solution of the cationic auxiliary agent of about 40% to 70% strength. The quantity of surface-active auxiliary agent required for this purpose generally amounts to 3 to 40 times, preferably 3 to 10 times the amount by weight of the pigment used. In practice, efforts will be made to keep the amount of auxiliary agent as low as possible. In some cases, for instance, if very difficultly soluble pigments are concerned, or, in particular, if the cationic surface-active auxiliary agent used is not sufficiently alkaline, it may be suitable to use an agent showing a strong basic action and, if desired, an organic solvent for the preparation of the concentrated pigment solution. When operating in this way, a strong base and, if desired, a suitable organic solvent are added in an amount sufficient to yield a clear pigment solution. The amount of the strong base added is such that a pH-value of at least 12 is attained. For reasons of economy, the amount of the organic solvent added should be as small as possible. Generally, up to about 10 parts by weight of the organic solvent per part by weight of pigment are sufficient.

In some cases, especially if dyestuffs very sparingly soluble or difficultly maintainable in solution are concerned, it may be suitable to add a polyalkylene-glycol of high molecular weight, especially a polyethylene-glycol having a molecular weight of about 150–5000, to the pigment solutions in order to stabilize them. Instead of the polyalkylene-glycols or in conjunction therewith, other non-ionic products may likewise be used, for instance, addition products of ethylene-oxide to compounds containing hydroxyl- or amino-groups, as, for instance, alcohols, fatty acids, alkyl-phenols, amines and the like.

The concentrated pigment solution is added to the water-containing plastic mass prior to its final shaping; it can, however, also be diluted at first with water (which may contain an alkali) to such an extent that the desired concentration of the pigment is attained. If, on dilution with water or on storing pigment solutions prepared with insufficient amounts of cationic agents, turbidities should occur, these can easily be dissolved generally by a further addition of a cationic surface-active substance.

According to the invention, cationic auxiliary agents may be used in which the cation constitutes the greater part of the molecule. As appropriate cationic surface-active compounds there enter into consideration, above all, the quaternization products derived from fat amines, i.e. aliphatic amines with an alkyl radical containing about 8–22 carbon atoms. The quaternary ammonium bases or likewise their salts with inorganic or organic acids can be used, such, for instance, as hydrohalic acids, acetic acid, sulfuric acid, lactic acid, formic acid, citric acid, tartaric acid, from which the corresponding bases are formed by addition of alkalies. Preferably, the ammonium bases are directly used. A mixture of the various cationic auxiliary agents of the above-mentioned type can likewise be used. There enter into consideration quaternary ammonium compounds of the general formula

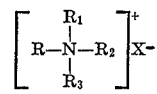

wherein R represents a high-molecular organic radical with at least 8 carbon atoms, $R_1$, $R_2$ and $R_3$ are alkyl-, aralkyl- or aryl radicals which may be substituted or, together with the nitrogen atom, may form a heterocyclic ring, and X represents an anion.

R may be an aliphatic, straight-chained or branched hydrocarbon radical with 8–22 carbon atoms which may contain one or several double linkages, hetero atoms such as oxygen or quaternized nitrogen atoms, or functional groups, such as carboxylic acid groups, in the chain. Furthermore, R may be an aromatic, hydroaromatic or cycloaliphatic radical which may carry aliphatic side chains. The alkyl-, aralkyl- or aryl radicals $R_1$, $R_2$ and $R_3$ may be the same or different and may contain substitutents such, for example, as halogen atoms, hydroxy-alkyl- or polyalkyleneglycol ether groups. Together with the nitrogen atom they may form a heterocyclic ring, for instance, a pyridine or morpholine ring. The anion X may represent the hydroxyl group or the monovalent anion of an inorganic or organic acid; it may, for instance, represent the anion of a hydrohalic acid such as hydrochloric or hydrobromic acid, or of another inorganic acid, for instance, sulfuric acid or phosphoric acid, or of an organic carboxylic acid, for instance acetic acid, formic acid, oxalic acid, lactic acid, tartaric acid, gluconic acid, citric acid or benzoic acid, or of an organic sulfonic acid, for instance methane-sulfonic acid or benzene-sulfonic acid.

Suitable quaternary ammonium compounds are, for instance, dodecyl-dimethyl-benzyl-ammonium chloride,
oleyl-trimethyl-ammonium chloride,
distearyl-dimethyl-ammonium chloride,
lauryl-dimethyl-hydroxy-ethyl-ammonium chloride,
dodecyl-di-(hydroxy-ethyl)-methyl-ammonium chloride,
dodecyl-dimethyl-vinyl-ammonium chloride,
dodecyl-di-[(hydroxy-diethoxy)-ethyl]-benzyl-ammonium chloride,
nonylphenyl-dimethyl-benzyl-ammonium chloride,
oleyl-di-(hydroxy-ethyl)-ethylene-glycol ether-ammonium chloride,
oleyl-dimethyl-hydroxy-ethyl-ammonium chloride,
coconut-oil-alkyl-di-(triethylene-glycol ether)-benzyl-ammonium chloride,
coconut-oil-alkyl-dimethyl-benzyl-ammonium chloride,
coconut-oil-alkyl-dimethyl-$\gamma$-hydroxypropyl-ammonium chloride,
distearyl-dimethyl-ammonium chloride trioctyl-methyl-ammonium chloride,
coconut-oil-alkyl-dimethyl-$\omega$-hydroxypropyl-ammonium chloride and compounds of the formulae

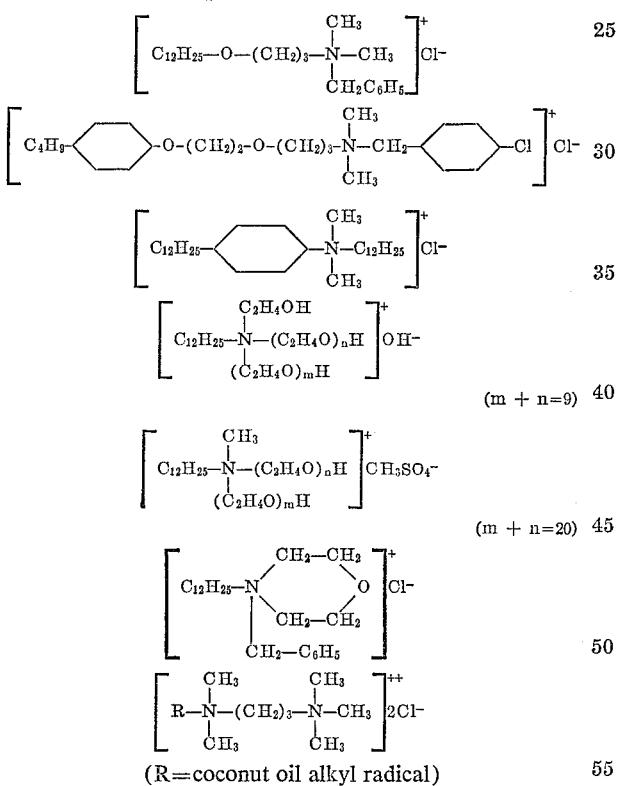

(R=coconut oil alkyl radical)

Often the cationic compounds such as dodecyl-methyl-morpholinium-chloride, lauryl-pyridinium chloride, hexadecyl - N,N' - dimethyl - benzimidazolinium - sulfate derived from heterocyclic nitrogen containing bases such as pyridine and morpholine, proved suitable.

As cationic surface-active compounds there can further be used quaternary phosphonium compounds of the general formula

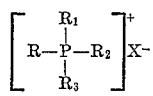

in which R, $R_1$, $R_2$ and $R_3$ as well as X have the meanings given above. Appropriate quaternary phosphonium compounds are, for instance, dodecyl-dimethyl-benzyl-phosphonium chloride, dodecyl-trimethyl-phosphonium chloride, dodecyl - dimethyl - hydroxy-ethyl-phosphonium chloride, coconut oil-alkyl-dimethyl-benzyl-phosphonium chloride, oleyl-dimethyl-benzyl-phosphonium chloride.

Especially suitable cationic auxiliary agents are those containing polyalkylene-glycol ether radicals, especially polyethylene and/or polypropylene-glycol ether radicals, in the molecule. Products are preferably used which contain at least 4, generally up to about 40, preferably 6 to 30, alkylene-glycol ether units of the formula —$C_nH_{2n}O$— ($n=2$ or 3) in the molecule. In the general formula of the cationic auxiliary agents these alkylene-glycol ether radicals are preferably present in the radicals $R_1$ and/or $R_2$ and/or $R_3$.

The hydroxy-alkyl groups or the polyalkylene-glycol ether radicals can be linked to the nitrogen atom directly or via aliphatic or aromatic radicals. The terminal hydroxyl groups of the glycol ether radicals can, moreover, be etherified by mono- or polyfunctional alcohols or esterified by inorganic or organic acids.

As organic solvents to be used, if desired, practically all non-acid water-soluble organic solvents or mixtures or solvents may be used. First of all, alcohols, ethers, acid amides, ketones and esters, such, for example, as ethanol, butanol, ethyl-diglycol, ethyl-thiodiglycol, polyalkylene-glycols, especially polyethylene-glycols with molar weights up to about 5000, dimethyl-formamide, phosphoric acid tris-dimethyl-amide, and acetone are suitable, as well as dimethyl sulfoxide. The use of an organic solvent is preferably dispensed with if value is attached to a high transparency of the dyed structures. In this regard, high-molecular weight polyglycols, however, do not show a disadvantageous effect.

As strongly basic agents, strong organic or inorganic bases, preferably alkali metal hydroxides or ammonia, which are suitable to convert the ammonium salts into the corresponding bases may be used.

As phthalocyanine pigments there enter into consideration water-insoluble phthalocyanine dyestuffs containing several, preferably 2 to 4, sulfonic acid arylamide or sulfonic acid alkylamide groups. These dyestuffs can be prepared, for example, according to the process of German Patent 696,591 by reaction of metal-containing phthalocyanine-sulfonic acid chlorides with aromatic amines such as aniline, toluidines, xylidines, ethylanilines, anisidines, phenetidines or naphthylamines which may contain substituents not causing solubility in water, such as halogen atoms, nitro-, trifluoromethyl-, cyano-, acyl-, carboxylic acid ester- and carboxylic acid amide groups, or with aliphatic amines, such as methylamine, propylamine, butylamine or benzylamine.

All azo-pigments in which at least one group showing a weakly acid action, i.e., a hydrogen atom capable of being substituted, is present or may be formed by internal rearrangement with the action of strong bases, are useful for the process of the present invention. Such groups are, for instance, hydroxy groups linked to aromatic nuclei, carboxylic acid amide groups on or between aromatic nuclei, cyanuric acid amide groups, enolisable groups in acyl-acetyl compounds and pyrazolones or their derivatives, and carboxylic acid amide groups contained in a heterocyclic ring. There are mentioned, for instance, azo-pigments of the following groups: azo-pigments of the ice-color series without solubilizing groups, derived from monovalent and polyvalent bases as diazo components with coupling components. The coupling components may be, for instance, aromatic hydroxy compounds such as $\beta$-hydroxy-naphthalene or hydroxy-aryl-carboxylic acid arylides, for example, o-hydroxy-anthracene-carboxylic acid anilide or coupling substances derived from carbazole, diphenylene-oxide or diphenyl-imide and from benzocarbazole, furthermore, enolisable acyl-acetylamino compounds or pyrazolones. One or several azo-groups may be contained in the molecule.

As plastics dyeable according to the process of the present invention there may be used semi-synthetic or fully synthetic plastics formed from aqueous solutions. Suitable plastics are, for instance, viscose, acetyl-cellulose and regenerated celluloses according to the copper-oxideammonia process, polyvinyl-chloride, as well as homopolymers and copolymers containing nitrile groups such as vinylidene cyanide, vinyl-acetate and styrene-sulfonic acid. When viscose is to be dyed, the process of the present invention proves especially suitable.

In practice, the process of the present invention shows the special advantage that the spinning nozzles are not obstructed by depositing pigment particles so that spinning is not undesirably interrupted.

The structures dyed in bulk according to the process of the present invention are of a brilliance not attained heretofore and show good fastness properties. When dyeing structures having a large surface, especially foils, a complete transparency of the dyeings can be attained.

In the following examples the parts, as far as they are not designated otherwise, are parts by weight and the percents indicated are percent by weight.

Example 1

45 parts of a yellow disazo-dyestuff from 1 mol of tetrazotized 3,3'-dichloro-4,4'-diamino-diphenyl and 2 mols of aceto-acetylamino-benzene are stirred into 860 parts of a mixture consisting of 235 parts of the ammonium base of the formula

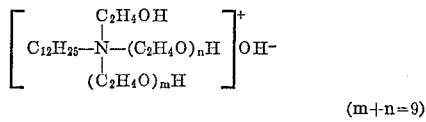

(m+n=9)

265 parts of polyglycol showing an average molecular weight of 1000, and 500 parts of water; 95 parts of an aqueous hydroxide solution of 33% strength are then added and the mixture is heated to 70–80° C. while being stirred. The dyestuff dissolves to give an orange color and remains in solution after cooling.

It is possible to combine 860 parts of the above-mentioned mixture with the 95 parts of sodium hydroxide solution of 33% strength, to heat the mixture to 70–80° C. and then to introduce the 45 parts of dyestuff. After stirring for a short period, the dye completely dissolves.

If 177.7 parts of said dyestuff solution are added in several doses to 5000 parts of a non-subdued viscose spinning mass, about 400 parts of intensely dyed yellow fibers of an especially high brilliancy are obtained after the mass has passed the usual spinning baths and subsequently been dried. The dyestuff is present in the fiber in a practically dissolved state. With a magnification of 500 times no pigment particles are perceptible.

Alternatively, the spinning of the dyed, aged viscose spinning mass can be carried out through a narrow, long slit into a precipitator instead of through spinning nozzles. In this manner, a foil dyed intensely yellow is obtained after having passed the usual baths. This foil is extraordinarily transparent, it shows an excellent brilliancy and good fastness properties.

Analogous results are obtained by introducing 45 parts of the above-mentioned dyestuff into a mixture of 95 parts of sodium hydroxide solution of 33% strength and 430 parts of a condensation product of coconut oil-amine with 20 mols of ethylene-oxide, quaternized with dimethyl-sulfate. The mixture is heated to 70–80° C., whereby the dyestuff is completely dissolved with stirring.

The above-mentioned dyestuff solutions can likewise be used for dyeing a paper pulp produced of wood cellulose.

Example 2

45 parts of an orange diazo dyestuff from 1 mol of 3,3'-dichloro-4,4'-diamido-diphenyl and 2 mols of 1-phenyl-3-methyl-5-pyrazolone are stirred into 955 parts of a mixture of 235 parts of the ammonium base of the formula

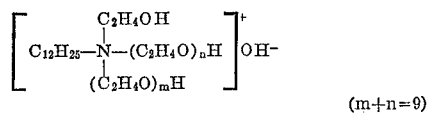

(m+n=9)

265 parts of polyglycol of an average molecular weight of 1000, and 500 parts of water. After having been stirred for a short time, the dyestuff completely dissolves at room temperature, showing a clear, intense orange shade.

By addition of 177.7 parts of this dyestuff solution in several portions to 5000 parts of a ripened cellulose spinning mass, about 400 parts of intensely orange fibers or foils of high brilliancy, excellent transparency and good fastness properties are obtained after the mass has passed the baths usually used for the aftertreatment.

Likewise in the production of synthetic guts the above-mentioned dyestuff solution can advantageously be used for dyeing the cellulose in the spinning process. In this manner, guts of especially good transparency and of a high brilliancy are obtained.

Instead of the mixture of 955 parts, a mixture of 463.5 parts of a condensation product of coconut-oil amines with 20 mols of ethylene-oxide, quaternized with dimethyl-sulfate, and 28 parts of sodium hydroxide solution of 33% strength can likewise be used for dissolving and stabilizing the 45 parts of dyestuffs.

Example 3

22.5 parts of the red monoazo-dyestuff obtained by diazotization of 2,5-dichloroaniline and coupling with 2,3-hydroxy-naphthoyl-aniline are introduced at 25–30° C. while stirring into a mixture of 20.5 parts of an aqueous sodium hydroxide solution of 33% strength and 457 parts of a mixture consisting of 235 parts of the ammonium base of the formula

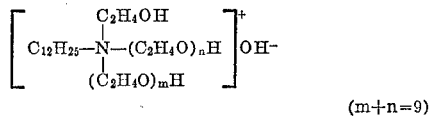

(m+n=9)

265 parts of polyglycol of an average molecular weight of 1000, and 50 parts of water. After stirring for about 1 hour the dyestuff is dissolved, showing a deep, dark-red color.

By adding 222 parts of this dyestuff solution in several portions to 5000 parts of cellulose matured for spinning, there are obtained after spinning, passing of the usual baths and drying, fibers and foils—according to the arrangement of the nozzles—of deep, red color, excellent brilliancy and high transparency.

This dyestuff solution can likewise be used for dyeing a paper pulp produced of wood cellulose.

Example 4

20 grams of copper-phthalocyanine-trisulfonic acid anilide are dissolved at 70° C. in a mixture consisting of 60 cc. of aqueous sodium hydroxide solution of 32.5% strength, 200 cc. of water, 100 grams of polyethyleneglycol of an average molecular weight of 1000 and 100 grams of the compound of the formula

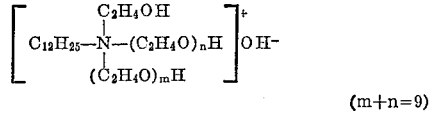

(m+n=9)

For dyeing a viscose spinning mass, 40 cc. of the pigment solution in 1000 g. of viscose, corresponding to 90 g. of cellulose, are stirred in or introduced through nozzles. The dyed viscose is then spun in the usual manner on a spinning machine. A transparent greenish blue thread is obtained. A rise of pressure at the spinning nozzle does not occur, even if the spinning is performed for several hours.

Example 5

20 grams of copper phthalocyanine trisulfonic acid butylamide are dissolved in a mixture of 60 cc. of aqueous sodium hydroxide solution of 32.5% strength, 100 cc. of water and 300 grams of the compound of the formula

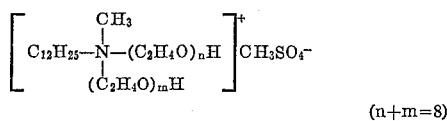

(n+m=8)

50 grams of the pigment solution are stirred into 1000 grams of viscose spinning mass, corresponding to 90 grams of cellulose. The dyed viscose is spun in the usual manner on a spinning machine. A transparent, greenish blue thread is obtained. A rise of pressure at the spinning nozzle does not occur even if the spinning takes several hours.

Example 6

10 grams of copper-phthalocyanine-trisulfonic acid anilide are stirred for 1 hour at 65° C. into a mixture of 3 grams of an aqueous sodium hydroxide solution of 32.5% strength and 35 grams of the compound of the formula

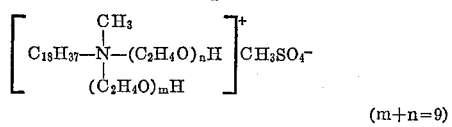

(m+n=9)

52 cc. of water of 65° C. are then added and stirring is continued at 65° C. for one further hour.

25 grams of the solution obtained are then stirred in or introduced by nozzles into 1000 grams of viscose corresponding to 90 grams of cellulose. The dyed viscose is then spun in the usual manner on a spinning machine. A highly brilliant greenish blue thread is obtained.

Instead of copper-phthalocyanine-trisulfonic acid anilide the following dyestuffs can likewise be used:

| Dyestuff: | Shade |
|---|---|
| Nickel-phthalocyaninetrisulfonic acid anilide | Greenish blue. |
| Copper - phthalocyanine - trisulfonic acid-m-nitrophenylamide | Greenish blue. |
| Nickel - phthalocyanine - trisulfonic acid-m-nitrophenyl-amide | Turquoise. |
| Copper - phthalocyanine - trisulfonic acid-2,5-dichloro-phenylamide | Greenish blue. |

Example 7

12 parts of the red monoazo-dyestuff obtained by diazotization of 2,4,5-trichloraniline and coupling with 2,3-hydroxy-naphthoyl-o-toluidine are stirred into a mixture of 10 parts of aqueous hydroxide solution of 38° Bé., 80 parts of a compound of the formula

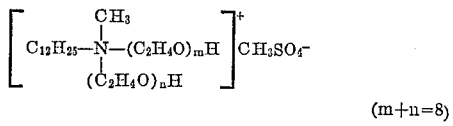

(m+n=8)

and 98 parts of water, heated to 75° C. and dissolved by stirring at this temperature for 45 minutes.

Example 8

A polyvinyl-chloride soft paste of 60 parts of polyvinyl chloride, 40 parts of dioctyl-phthalate, 1 part of titanium dioxide and 0.1 part of diphenyl-urea is dyed by stirring in 1.69 parts of a solution consisting of 15 parts of the orange disazo dyestuff from 1 mol of 3,3-dichloro-4,4'-diamido-diphenyl and 2 mols of 1-phenyl-3-methyl-5-pyrazolone, dissolved in 56.4 parts of ammonium base of the formula

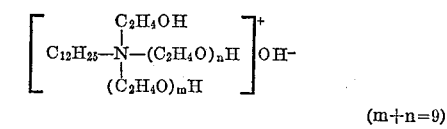

(m+n=9)

63.6 parts of polyethylene-glycol of an average molecular weight of 1000, and 120 parts of water. The dyed paste is spread on paper and gelatinized at 160° C. Even after a wetting-out period of the dyed soft paste of only 2 minutes, a maximal depth of shade is attained, which with corresponding dyeing by means of dyestuff powders is only possible after a wetting-out period of several hours.

Example 9

22 parts of the disazo dyestuff from 1 mol of 3,3'-dichloro-4,4'-diamido-diphenyl and 2 mols of 1-phenyl-3-methyl-5-pyrazolone, dissolved in 82.7 parts of ammonium base of the formula

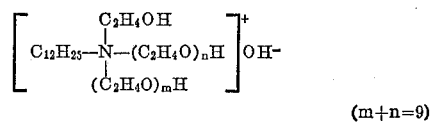

(m+n=9)

93.3 parts of polyethylene-glycol of an average molecular weight of 1000, and 176 parts of water diluted by means of 132 parts of acetonitrile are introduced by means of nozzles into a polymer solution consisting of 191.5 parts of a copolymer of vinyl-acetate and vinylidene-cyanide in a ratio of 1:1, 550 parts of acetonitrile, 50.5 parts of water and 50.5 parts of $\frac{1}{10}$ N-sodium hydroxide solution. The solution obtained is spun into threads in the usual manner, stretched and dried; there orange-dyed threads showing the properties characteristic for this class of polymers result.

We claim:

1. A process for the mass coloration of regenerated cellulose or polyvinyl chloride structures shaped from aqueous solutions, which process comprises mixing said solutions before shaping with an aqueous alkaline pigment solution comprising (a) a dissolved pigment selected from the group consisting of normally water-insoluble azo-pigments having at least one weakly acid radical and normally water-insoluble azo-pigments having at least one radical which can be converted into a weakly acid radical by means of a strong base, and normally water-insoluble phthalocyanine pigments having at least two radicals selected from the group consisting of sulfonic acid aryl amide and sulfonic acid alkyl amide radicals, and (b) a quaternary cationic surface-active compound solubilizing said normally water-insoluble pigments, the weight of said compound being from 3 to 40 times the weight of the pigment.

2. A process as defined in claim 1 wherein said quaternary cationic surface-active compound is a quaternary ammonium compound having at least one polyalkylene glycol ether radical consisting of up to 20 alkylene glycol ether units in the molecule.

3. Transparent mass colored articles of regenerated cellulose or polyvinyl chloride shaped from aqueous solutions and dyed in the mass by mixing said solutions prior to shaping with an aqueous alkaline pigment solution comprising (a) a dissolved pigment selected from the group consisting of normally water-insoluble azo-pigments having at least one weakly acid radical and normally water-insoluble azo-pigments having at least one radical which can be converted into a weakly acid radical by means of a strong base, and normally water-insoluble phthalocyanine pigments having at least two radicals selected from the group consisting of sulfonic acid aryl amide and sulfonic acid alkyl amide radicals, and (b) a quaternary cationic surface-active compound solubilizing said normally water-insoluble pigments, the weight of said compound being from 3 to 40 times the weight of pigment.

4. A process as defined in claim 1 wherein said pigment solution additionally comprises a strong base.

5. A process as defined in claim 1 wherein said quaternary cationic surface-active compound is a quaternary ammonium compound comprising from 4 to 40 alkylene glycol ether units of the formula —$(C_nH_{2n}O)$—, where $n$ is 2 or 3.

References Cited

UNITED STATES PATENTS

| | | | |
|---|---|---|---|
| 2,145,580 | 1/1939 | Bly | 106—165 |
| 2,234,031 | 3/1941 | Wenning | 106—165 |
| 2,927,035 | 3/1960 | Wegmann | 106—165 |
| 2,911,314 | 10/1959 | Armento | 106—165 |
| 3,156,574 | 1/1964 | Gomm | 106—165 |
| 2,839,523 | 6/1958 | Towne et al. | 264—78 |
| 2,857,371 | 10/1958 | Straley et al. | 264—78 |

FOREIGN PATENTS

| | | |
|---|---|---|
| 924,001 | 4/1963 | Great Britain. |
| 930,614 | 7/1963 | Great Britain. |
| 936,737 | 9/1963 | Great Britain. |

JULIUS FROME, *Primary Examiner.*

ALEXANDER H. BRODMERKEL, MORRIS LIEBMAN, *Examiners.*

B. SNYDER, *Assistant Examiner.*